United States Patent [19]

Pearce

[11] 4,411,221
[45] Oct. 25, 1983

[54] TURNING OF EGGS IN INCUBATORS
[76] Inventor: Francis H. Pearce, West Brinsea, Congresbury, Avon BS19 5JR, England
[21] Appl. No.: 344,869
[22] Filed: Feb. 1, 1982
[30] Foreign Application Priority Data Feb. 25, 1981 [GB] United Kingdom ............... 8105871

[51] Int. Cl.³ ............................................. A01K 41/06
[52] U.S. Cl. ..................................................... 119/44
[58] Field of Search ............................. 119/36, 39, 44
[56] References Cited

U.S. PATENT DOCUMENTS 1,716,892 6/1929 Kaiser .................................. 119/44
4,215,651 8/1980 Pearce .................................. 119/36

FOREIGN PATENT DOCUMENTS 268516 4/1927 United Kingdom .
310613 5/1929 United Kingdom .
410545 5/1934 United Kingdom .
593334 10/1947 United Kingdom .
2007957 5/1979 United Kingdom .
2034571 6/1980 United Kingdom .
1588589 4/1981 United Kingdom .

Primary Examiner—Hugh R. Chamblee
Attorney, Agent, or Firm—Larson and Taylor

[57] ABSTRACT

An incubator for turning eggs is disclosed, which comprises:
a housing for accommodating eggs to be hatched;
a member (4) within the housing and capable of moving with respect to the housing;
motive means for intermittently causing relative movement between the member (4) and the housing; and
at least one elongate channel-defining element (10) having a longitudinally extending axis (11) and capable of contacting the member (4) in a manner such that, upon intermittent movement of the member (4), the element (1) is caused to undergo corresponding intermittent rotational movement about its own longitudinally extending axis (11) thereby causing rotation of any eggs (2) located within the element (10).

11 Claims, 5 Drawing Figures

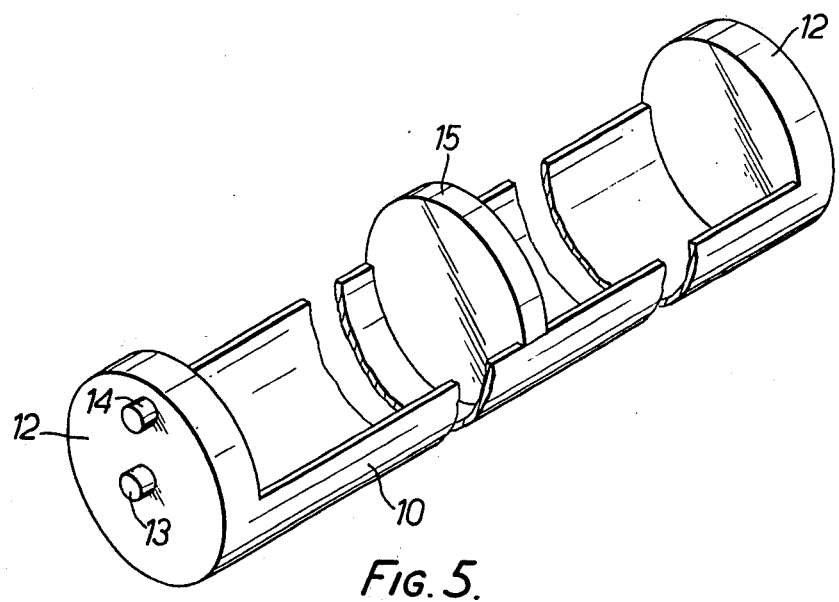

TURNING OF EGGS IN INCUBATORS

This invention relates to the turning of eggs in incubators during an incubation process.

It is known that the turning of eggs periodically during incubation is necessary to ensure good hatching results. Incubators are known in which the turning of eggs is effected automatically, for example as disclosed in my U.S. patent application Ser. No. 957,854 (U.S. Pat. No. 4,215,651).

U.S. Pat. No. 4,215,651 describes and claims an incubator which comprises:
 a housing for accommodating eggs to be hatched;
 a tray within the housing, for supporting the eggs;
 heating means for heating air;
 dividers, for dividing eggs on the tray into rows; and
 motive means for intermittently causing relative movement between the tray and the dividers.

Preferably the tray is reciprocable with respect to the housing and moves freely on roller means, the tray is provided with two downwardly directed lugs, and the said motive means includes a motor with an arm inclined to the shaft of the motor, such that actuation of the motor causes the arm, in one complete circular movement of the arm, to urge one lug and hence the tray in one direction and then to urge the other lug and hence the tray in the opposite direction, the arm carrying a roller means for rolling abutment against the lugs; the incubator including two parallel rows of notches, whereby dividers can be positioned so that the distance between two adjacent dividers is slightly greater than the diameter of the eggs to be hatched.

In addition such an incubator may be provided with a flexible screen for covering the eggs, and a fan.

U.S. Pat. No. 4,215,651 also describes and claims an incubator which comprises:
 a housing for accommodating eggs to be hatched;
 support means within the housing, for supporting eggs;
 a flexible screen for placing over eggs on the support means;
 heating means for heating air; and
 guide means for guiding air, heated in use by the heating means, above the flexible screen whereby, in use, the screen is heated and heat is conducted through the screen so as to heat upper regions of eggs.

Conveniently in such an incubator the support means is a tray, there being dividers above the tray to divide eggs on the tray into rows, there being provision for relative movement between the tray and the dividers, and there being motive means for intermittently causing said relative movement, thereby to cause intermittent rotation of the eggs. Preferably the tray is reciprocable with respect of the housing and moves freely on roller means, the tray is provided with two downwardly directed lugs, and the said motive means includes a motor with an arm inclined to the shaft of the motor, such that actuation of the motor causes the arm, in one complete circular movement of the arm, to urge the lug and hence the tray in one direction and then to urge the other lug and hence the tray in the opposite direction. Preferably the dividers can be positioned so that the distance between two adjacent dividers is slightly greater than the diameter of the eggs to be hatched.

All the foregoing types of incubators described above will be referred to hereinafter as "my earlier incubators".

The means of turning eggs described above has proved effective in practice, is economic to produce and versatile for a range of eggs sizes. However, very small eggs which tend to be very pointed at one end can sometimes be difficult to manage in my earlier incubators, and this problem has given rise to the present invention.

According to one aspect of the present invention there is provided an incubator which comprises:
 a housing for accommodating eggs to be hatched;
 a member within the housing and capable of moving with respect to the housing;
 motive means for intermittently causing relative movement between the member and the housing; and
 at least one elongate channel-defining element having a longitudinally extending axis and capable of contacting the member in a manner such that, upon intermittent movement of the member, the element is caused to undergo corresponding intermittent rotational movement about its own longitudinally extending axis thereby causing rotation of any eggs located within the element.

It should be noted that the elements used in the present invention may take a form entirely compatible with my earlier incubators and may be used in conjunction with such incubators.

Conveniently, but not necessarily, the member is a tray capable of reciprocating movement with respect to the housing and the motive means is capable of causing relative reciprocating movement between the member and the housing.

In this case, conveniently the tray is capable of moving freely on roller means and is provided with two downwardly extending lugs, and the motive means includes a motor having a shaft on which is provided an inclined arm, such that actuation of the motor causes the arm, in one complete circular movement of the arm, to urge one of the two lugs and hence the tray in one direction and then to urge the other of the two lugs and hence the tray in the opposite direction. As the channel-defining element contacts the member (in this case the tray), the intermittent reciprocating movement of the member causes intermittent oscillatory movement of the element.

Eggs to be incubated are placed in the elements, the internal diameter of which is at least as large as the diameter of the eggs, such that the eggs lie end to end within the elements, which are pivotally mounted and usually caused to rotate about their longitudinal axis through a part of a revolution and back, thereby causing the eggs to be turned through a part of a revolution and back. Naturally, the eggs always tend to lie at the bottom of the elements.

The or each element may have, over a majority of its length, a cross-section in the form of a complete circle. The advantage of this is that there is no danger of the eggs being tipped laterally from the element upon rotation of the latter, although it is to be appreciated that in view of accessibility this type of element is, in practice, only suitable for the early stages of incubation, before the chicks emerge from the eggs.

Preferably each element has, over a majority of its length, a cross-section in the form of part of a circle. Thus, for instance, each element may have, over a majority of its length, a cross-section corresponding to a semi-circle.

The elements may be rather more than semi-circular in cross-section to permit a greater angle of turning in certain cases where such a procedure may prove to be necessary for high incubation success. Some experts believe that this is the case with the eggs of geese, for example.

Preferably, but not necessarily, each element has, at its opposing end regions, end plates each provided with a pivot pin lying on the longitudinally extending axis of the element. The pins may be located in notches of the notched plates of my earlier incubators, instead of the dividing rods.

Each element may also include means for limiting the degree of rotation of the element about is longitudinally extending axis. Thus, for instance, when each element is provided with an end plate with the axial pivot pin, each end plate may be provided, in addition to the pivot pin, with a non-axially disposed further pin capable of abutting a notched plate having a notch in which the pivot pin is located, such abutment limiting the degree of rotation of the element.

An advantage of having means for preventing turning of the elements beyond the angle where the eggs are safely retained, is that in the event of a lack of synchronisation, perhaps as a result of initial setting up or owing to some "creep" in the relative movement between the member and the element, the elements can be synchronised at the ends of their rotational movements. One possible means for limiting rotational movement of each element is the provision of a small external projection from each side of the element arranged to strike the tray and inhibit further rotation. A preferred arrangement is, however, that described above in which the end plates have further pins. This arrangement has the advantage of having no lateral projections which may fowl adjoining elements. It will be understood that once the rotation of the elements is stopped by the appropriate limiting means, the tray will slide beneath the elements until its travel is completed. The tray and elements will then be synchronised for future cycles.

The incubator may include two opposing notched plates each provided with a plurality of corresponding notches in which the pivot pins of elements in a first layer may be located.

The incubator may have provision for a further layer of elements to be accommodated above, and in contact with, elements located as first layer between the two notched plates. The further layer of elements may be held in a frame to permit the removal of the further layer of elements and to permit the correct disposition of the elements of the further layer while still permitting rotation of those elements. The elements in the further layer of elements may be immediately above the elements in the first layer of elements, or they may be offset.

The upper layer of elements may be placed above the first layer with the lower part of each upper element supported by the upper parts of circular end plates of the elements below. The turning motion is then imparted from the lower layer to the upper layer by friction at the points of contact.

Elements may have circular spacers mounted transversely within the channel to provide intermediate support for elements above where the length of elements is such that additional support is necessary.

The elements may be formed of any suitable material, such as a plastics material or a metal.

The elements may be provided with perforations to permit greater movement of air around any eggs in the element.

The present invention also provides a method of turning eggs in an incubator, which comprises locating the eggs in channel-defining elements in an incubator and causing intermittent rotation of the elements thereby imparting intermittent roation to the eggs in the elements.

For a better understanding of the present invention and to show how the same may be carried into effect, reference will now be made, by way of example, to the accompanying drawings in which:

FIG. 5 is an isometric view from above of one embodiment of an element for use in accordance with an incubator of the present invention.

The elements illustrated in the accompanying drawings may be used in conjunction with one of my earlier incubators and, therefore, to avoid any unnecessary repetition, it is recommended that reference is made to the specification(s) disclosing my earlier incubators.

Figure 1:
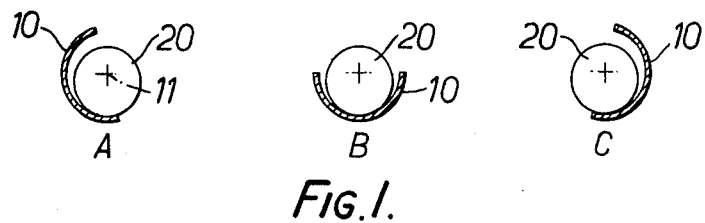
FIG. 1 is a cross-section through an element accommodating an egg, shown in three positions.

Referring first to FIG. 1 of the accompanying drawing, there is shown, in cross-section, an element 10 which has a longitudinally extending axis 11 about which it may be rotated. Located in the element 10 is an egg 20 to be incubated. As shown in FIG. 1A the element 10 has been rotated as far as possible in a clockwise direction without causing the egg 20 to be tipped from the element 10. The central position is shown in FIG. 1B in which the egg 20 lies on a central portion of the element 10. In FIG. 1C the element 10 has been rotated to the full extent in the opposite direction, which will thus cause the egg to roll but again not so far as to cause the egg to be tipped from the element 10.

Figure 2:
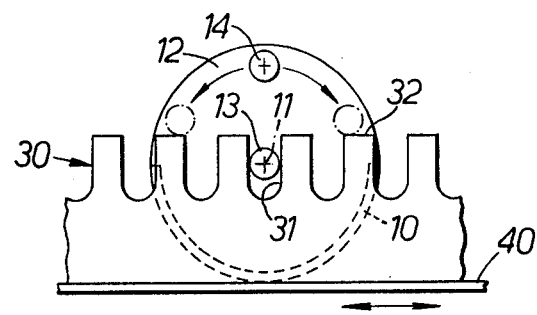
FIG. 2 is an end view of an element, showing also a notched plate and a reciprocatable tray.

In the arrangement shown in FIG. 2, the element 10 has, in addition to the channel-defining portion, end plates at its opposing ends, only one of which, 12, is shown. The end plate is provided on its axis with a pivot pin 13 and with a non-axially disposed, further pin 14. The pin 13 is located in a notch 31 of a notched plate 30 and the underside of the elment 10 rests on a reciprocatable tray 40.

In order to prevent eggs being tipped from the element 10, the further pin 14 is positioned such that once the element 10 has undergone a certain degree of rotation about its longitudinal axis 11, the further pin 14 abuts an upper edge 32 of the notched plate 30, thereby preventing further rotation of the element 10, regardless of any additional movement of the tray 40 tending to cause such further rotation. An advantage of such an arrangement is that, in practice, if there is a slightly excess movement of the tray 40, the fact that all of the elements 10 are ceased in their rotation at a certain angle causes the elements to be synchronised.

Figure 3:
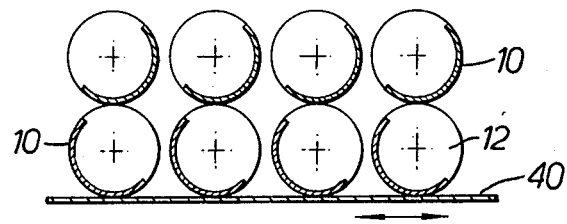
FIG. 3 is a cross-section through two layers of elements, with the elements in the upper layer directly above those in the lower layer.

FIG. 3 of the drawings shows an arrangement in which two layers of elements 10 are present. The lower layer of elements 10 rests on the reciprocatable tray 40 and the upper layer of elements rests on the lower layer in a manner such that rotation of the lower layer of elements 10 by movement of the tray 40 causes rotation in the opposite rotational direction of the elements 10 in the upper layer. The elements in the upper layer rest through their end plates 12 on the end plates 12 of the elements in the lower layer. In addition, to stop the elements in the upper layer from lateral movement the end plates of the elements in the upper layer can be provided with pivot pins held in notches which may be the same notches 31 as those used for locating the pivot pins 13 of the elements in the lower layer, or they may be notches in a separate frame which can be lifted out of the incubator to provide easy access to the elements in the lower layer.

Figure 4:
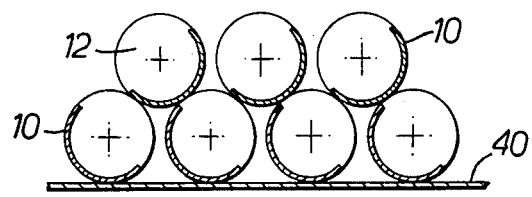
FIG. 4 is a cross-section through two layers of elements, with the elements in the upper layer being offset with respect to those in the lower layer.

As regards the arrangement shown in FIG. 4, this is a variation of the arrangement shown in FIG. 3, in that the elements in the upper layer are offset with regard to the elements in the lower layer, and here the elements in the upper layer rest not on a single element in the lower layer but on two elements in the lower layer. Again additional provision can be made to locate the elements in the upper layer to prevent any undue lateral movement and to prevent excessive rotation, in much the same way as corresponding provision is made for the elements in the lower layer, for example in the manner indicated in FIG. 2 of the drawings.

FIG. 5 of the drawings shows a preferred embodiment of an element for use with the present invention. The element has the usual egg-accommodating channel-defining portion 10 and is provided at its opposite end regions with end plates 12, each of which has an axial pivot pin 13 and a further pin 14 (for preventing excessive rotation). The element can be of any length and in the illustrated embodiment is shown cut off in two places. If desired at intermediate portions along the open-topped channel portion there may be provided circular or arcuate supports 15 for supporting and contacting the undersides of any elements in a layer of elements above the illustrated element.

As indicated above, the elements may be perforated. Moreover, the channel-defining elements need not have solid walls (apart from any perforations); instead the walls of the elements may be formed, for instance, of a mesh material or from a plurality of parallel longitudinally-extending wires or rods positioned so as to form the desired channel for accommodating eggs.

As is clear from FIG. 2 in particular, the notches 31 permit vertical movement of the pins 13 but prevent significant lateral movement of the pins 13. This can apply also to the elements in any layer or layers above the layer of elements contacting the member.

We claim:
1. In an incubator which comprises:
a housing for accomodating eggs to be hatched;
a member within the housing and capable of moving with respect to the housing;
motive means for intermittently causing relative movement between the member and the housing; and
a first layer of elongate channel-defining elements each having a longitudinally extending axis and capable of contacting the member in a manner such that, upon intermittent movement of the member, each element is caused to undergo corresponding intermittent rotational movement about its own longitudinal extending axis thereby causing rotation of any eggs located within the element;
the improvement which comprises the provision of a further layer of elongate channel-defining elements accomodated above, and in contact with, the elements of the first layer in a manner such that rotation of the elements in the first layer causes rotation of the elements in the further layer.

2. An incubator according to claim 1, wherein the further layer of elements is held in a frame to permit the removal of the further layer of elements and to permit the correct disposition of the elements of the further layer while still permitting rotation of those elements upon rotation of the elements in the first layer.

3. An incubator according to claim 2, wherein the elements in the further layer of elements are immediately above the elements in the first layer of elements.

4. An incubator according to claim 1, wherein each element has, over a majority of its length, a cross-section corresponding to a semi-circle.

5. An incubator according to claim 1, wherein the elements has, at its opposing end regions, end plates each provided with a pivot pin lying on the longitudinally extending axis of the element.

6. An incubator according to claim 1, which also includes means for limiting the degree of rotation of the element about its longitudinally extending axis.

7. An incubator according to claim 16, wherein each end plate of each element is provided, in addition to the pivot pin, with a non-axially disposed further pin capable of abutting a notched plate having a notch in which the pivot pin is located, such abutment limiting the degree of rotation of the element.

8. An incubator according to claim 1, which includes two opposing notched plates each provided with a plurality of corresponding notches in which the pivot pins of elements in a first layer may be located.

9. An incubator according to claim 1, in which the member is a tray capable of reciprocating movement with respect to the housing and the motive means is capable of causing relative reciprocating movement between the member and the housing.

10. An incubator according to claim 9, wherein the tray is capable of moving freely on roller means and is provided with two downwardly extending lugs, and the motive means includes a motor having a shaft on which is provided an inclined arm, such that actuation of the motor causes the arm, in one complete circular movement of the arm, to urge one of the two lugs and hence the tray in one direction and then to urge the other of the two lugs and hence the tray in the opposite direction.

11. A method of turning eggs in an incubator which comprises:
providing an incubator which comprises;
a housing for accommodating eggs to be hatched;
a member within the housing and capable of moving with respect to the housing;
motive means for intermittently causing relative movement between the member and the housing;
a first layer of elongate channel-defining elements each having a longitudinally extending axis and capable of contacting the member in a manner such that, upon intermittent movement of the member, each element is caused to undergo corresponding intermittent rotational movement about its own longitudinal extending axis thereby causing rotation of any eggs located within the element; and
a further layer of elongate channel-defining elements accomodated above, and in contact with, the elements of the first layer in a manner such that rotation of the elements in the first layer causes rotation of the elements in the further layer;
locating the eggs in both layers of channel-defining elements in the incubator; and
causing intermittent rotation of the elements thereby imparting intermittent rotation to eggs in the elements.

* * * * *